Nov. 15, 1938.   J. A. DRAIN, JR., ET AL   2,136,913
ROADWAY INSPECTING MEANS
Filed June 26, 1934
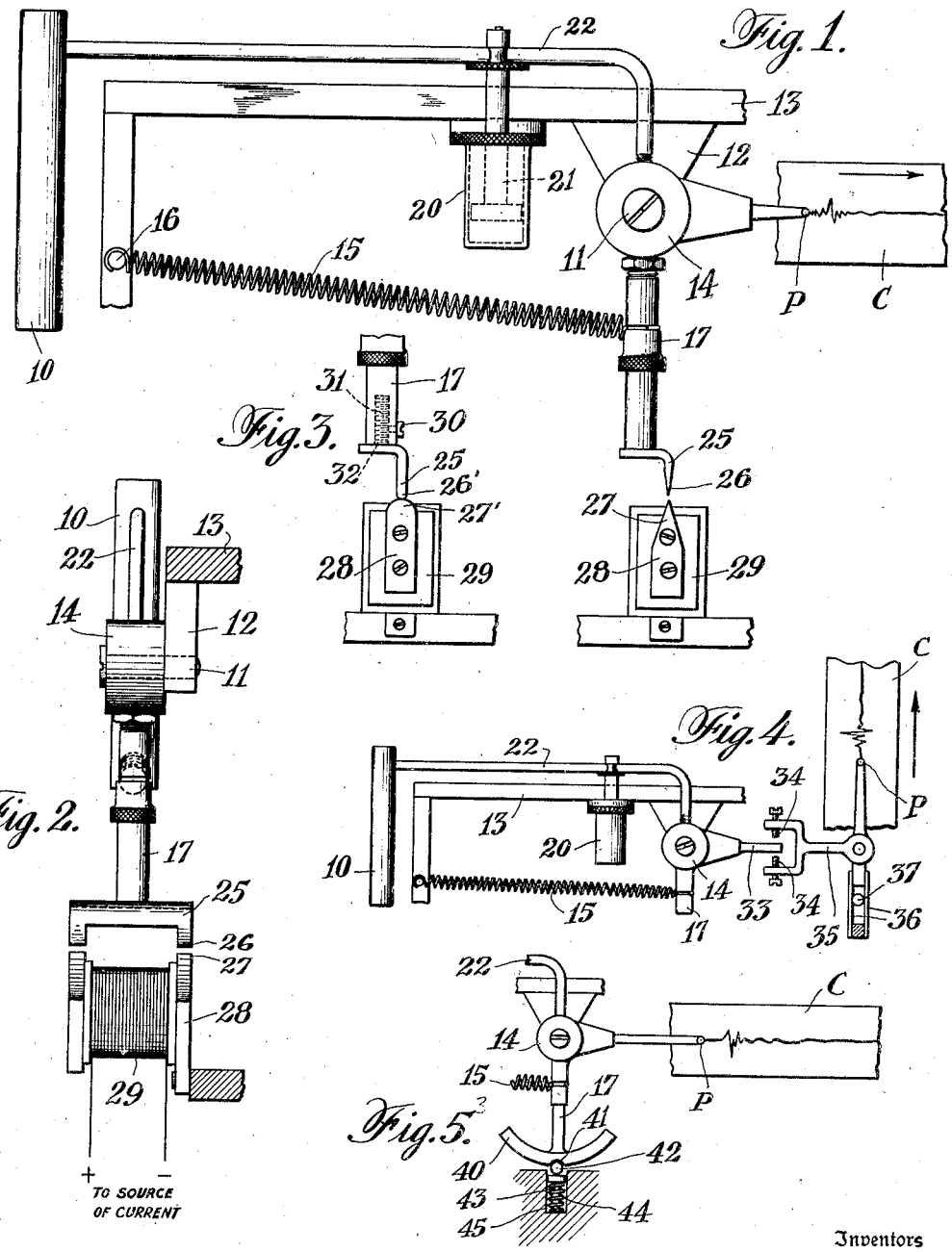
Inventors
James A. Drain, Jr. & Walter M. Perry
By Joseph H. Lipschutz
Attorney

UNITED STATES PATENT OFFICE 2,136,913

ROADWAY INSPECTING MEANS

James A. Drain, Jr., and Walter M. Perry, Brooklyn, N. Y., assignors to Sperry Products, Inc., Brooklyn, N. Y., a corporation of New York Application June 26, 1934, Serial No. 732,484

3 Claims. (Cl. 73—51)

This invention relates to recording devices and particularly to those devices designed to record vertical unevennesses in a surface such as the track of a railroad. Such devices usually employ a pivoted inertia weight which owing to its lag behind the vertical or bounce movements of a vehicle upon which it is mounted operates an indicator such as a recorder. The draw-back that resides in these devices is that the inertia weight is constantly moving since there are always present slight irregularities in the surface under test even though such irregularities are so small as to be below the limit of irregularity which it is desired to detect. Therefore, various retarding mechanisms have been applied to the inertia weights of these devices; but the defect which resides in such devices is that they introduce a more or less permanent error because such friction devices prevent the return of the inertia member and hence of the indicator to its original position.

It is therefore the principal object of our invention to provide means whereby a bounce recorder is made responsive only to those bounce movements which indicate irregularities in excess of a predetermined allowable irregularity. It is a further object of our invention to accomplish this result without hindrance to the return of the inertia member and the recorder to its original position at all times.

Further objects and advantages of this invention will become apparent in the following detailed description thereof.

In the accompanying drawing,

Fig. 1 is an elevation of a bounce recorder embodying one form of our invention.

Fig. 2 is a view taken at right angles to the Fig. 1 view.

Fig. 3 is a view corresponding to a portion of a view of Fig. 1 disclosing a modified form of the invention.

Fig. 4 is a view similar to Fig. 1 and disclosing another modification of the invention.

Fig. 5 is a view similar to Figs. 1 and 4 with parts broken away and disclosing still another modification of the invention.

Referring to Fig. 1 of the drawing, we have disclosed one form of our invention which comprises an inertia member 10 pivoted at 11 on a fixed bracket 12 on a support 13 which may be carried by a vehicle, for instance. Said vehicle may be a railroad car travelling along tracks to discover the vertical irregularities in the track. Or the vehicle may be a road vehicle such as a motor vehicle for detecting irregularities in the road bed. It will be seen that in any vertical movement of the support 13 there will be a lag of inertia member 10 behind said movements, and in general said lag will be proportional to the degree of such vertical movement and hence proportional to the irregularities in the road. The lag movements of the inertia member 10 with respect to the support 13 may be indicated by any suitable indicator such as a recording pen P supported on a hub 14 movable integrally with the inertia weight 10, said pen tracing a line upon a chart C which is supported to move integrally with support 13. Thus, if the mechanism is supported on a car, support 13 and chart C are supported within said car to move therewith. The inertia member 10 may be centralized by means of a suitable centralizing spring 15 fixed to the support 13 at 16 and to an extension 17 threaded into hub 14 and movable integrally with said hub and said inertia weight 10.

From the above description it will be seen that the inertia weight 10 would ordinarily be in continuous motion with respect to the car and the support 13 because in railroad track or on vehicular roads there is almost never a time when the track or road is absolutely level for any considerable distance. This would cause a continuous oscillation of the pen P upon the chart C, making it difficult to get any true picture of the condition of the road. Moreover, this continuous oscillation would tend to become periodic at times and build up to an extent which would give an erroneous indication of the condition of the road bed. Such periodic oscillation can be eliminated by means of a dash-pot 20, the cylinder of which is fixed to the support 13 and the piston 21 of which is carried by the arm 22 which carries inertia member 10. This dash-pot, however, is not effective to prevent the continuous response of the inertia member to small vertical variations in the surface under test, and such variations would be indicated by the pen P on the chart C.

It will be understood that in practically all testing by means of a bounce recorder it is desired to discover irregularities in the surface under test only to the extent that such irregularities exceed a predetermined allowable degree of irregularity. We have therefore shown several devices by which we are enabled to eliminate indications by pen P on chart C of any surface irregularities which are of lesser degree than those which it is desired to indicate. In other words, the recorder records only irregularities in excess of a predetermined minimum degree of surface irregularity. One such arrangement is disclosed in Fig. 1. In this form of the invention the extension 17 movable with the inertia member 10 is provided with a sharp pointed end member 25, the sharp edge 26 of which coacts with the sharp edge 27 formed by the core 28 of an electromagnet 29. When the inertia member 10 is in centralized position the two edges 26 and 27 are in alignment and therefore the flux set up by electromagnet 29 is concentrated at edge 27 within a very narrow field. The maximum flux is therefore concentrated at points 26 and 27 to hold the member 25, and therefore the inertia member 10, fixed against movement. The amount of current supplied to the electromagnet 29 determines the force with which the inertia member 10 is being held against movement and not until this force is exceeded will point 26 break loose from the narrow but strong field of attraction concentrated at point 27. In other words, not until a predetermined force acts upon inertia member 10 will said member be free to oscillate and therefore actuate pen P on chart C. Until this force is exceeded the points 26 and 27 will remain in substantial alignment and the very slight movement between them is less than the normal lost motion in the various parts of the mechanism so that pen P will not be affected until a vertical irregularity in the surface occurs which is sufficiently great to apply a force to inertia member 10 to move point 26 out of the field of force of point 27.

In a modified form of the invention (Fig. 3) end member 25 may be adjustably held in extension 17 by means such as a set screw 30 operating on a pin 31 in a recess 32 in said member 17. By this construction end member 25 may be carefully adjusted in position so that its end 26' may make actual physical contact with the end 27' of the electromagnet armature. Said ends graze one another and touch lightly to a degree which requires a predetermined force to free them from each other. The restoring force of spring 15 is sufficient to bring the tip of end 26' into alignment with the tip of end 27'. In this case, the ends 26' and 27' need not be sharp points and preferably are blunt ends as shown, because the actual physical contact will take the place of the concentrated field of flux at point 27 and said physical contact will accomplish the same purpose as the concentrated flux between points 26 and 27. The contact plus the electromagnetic attraction together constitute a predetermined force which must be overcome before inertia member 10 is free to respond to oscillation and to cause pen P to indicate a surface irregularity on the chart C.

In Fig. 4 we have disclosed another modification of the invention. In this form the parts are essentially similar to those in Fig. 1 but without the electromagnetic connections. In this form the hub 14 carries an extension 33 in place of the pen P. Interposed between said extension 33 and the pen P is a lost motion connection which may take the form of stops 34 normally spaced from extension 33, said stops being carried by an arm 35 integrally with the pen arm P. The degree of lost motion between extension 33 and stops 34 may be varied by screwing said stops into or out of the support arm 35. It will now be seen that although inertia member 10 is free to respond to even smaller surface irregularities, only those movements of inertia member 10 in excess of the lost motion provided between extension 33 and stops 34 will effect the pen P. In other words, only movements resulting in applying a force to inertia member 10 in excess of a predetermined critical force will be recorded. The pen may be centralized by centralizing springs 36 and stop 37.

Still another modification of the invention is disclosed in Fig. 5. This form corresponds to Fig. 1 except that in place of the electromagnetic connection the extension 17 carries an arcuate member 40 which is provided with a groove 41 in which is adapted to lodge a detent in the form of a spring pressed ball or detent 42. Said ball will normally engage in the groove 41 when the inertia member is in centralized position. The ball may be pressed into said groove by means of a piston 43 which is pressed by a spring 44 outwardly within a cylinder 45. It will now be seen that in principle this form of the invention is similar to those previously described, because until a surface irregularity is encountered which is of a degree sufficient to apply a force to inertia member 10 of a magnitude capable of overcoming the pressure of detent 42 within groove 41 there will be no actuation of the pen P. This critical force may be predetermined by regulating the pressure of spring 44 and hence the pressure of ball 42 within groove 41. Spring 15 will return arm 17 to initial position so that detent 42 may enter groove 41 after each actuation.

In accordance with the provisions of the patent statutes, we have herein described the principle and operation of our invention, together with the apparatus which we now consider to represent the best embodiments thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a device for indicating irregularities in a surface, said device being adapted to be mounted on a vehicle which responds to said irregularities, an inertia member pivotally mounted on said vehicle, an indicator, means whereby said indicator is actuated in response to relative movements between said vehicle and said inertia member, and electromagnetic means interposed between said vehicle and said member for normally applying a predetermined force and preventing actuation of said indicator, said electromagnetic means being adapted to be rendered ineffective to prevent actuation of said indicator when the force tending to displace said member relative to said vehicle exceeds said predetermined force.

2. In a device for indicating irregularities in a surface, said device being adapted to be mounted on a vehicle which responds to said irregularities, an inertia member pivotally mounted on said vehicle, an indicator, means whereby said indicator is actuated in response to relative movements between said vehicle and said inertia member, and electromagnetic means interposed between said vehicle and said member for normally applying a predetermined force and preventing actuation of said indicator, said electromagnetic means having means for localizing the flux between said member and said vehicle, said electromagnetic means being adapted to be rendered ineffective to prevent actuation of said indicator when the force tending to displace said member relative to said vehicle exceeds said predetermined force.

3. In a device for indicating irregularities in a surface, said device being adapted to be mounted on a vehicle which responds to said irregularities, an inertia member pivotally mounted on said vehicle, an indicator, means whereby said indicator is actuated in response to relative movements between said vehicle and said inertia member, and electromagnetic means interposed between said vehicle and said member for normally applying a predetermined force and preventing actuation of said indicator, said electromagnetic means comprising a coil and core part and an armature part, one of said parts being carried by said vehicle and the other part by said member, said core and armature being normally in physical contact, said electromagnetic means being adapted to be rendered ineffective to prevent actuation of said indicator when the force tending to displace said member relative to said vehicle exceeds said predetermined force.

JAMES A. DRAIN, Jr.
WALTER M. PERRY.